United States Patent
Giedeman, III et al.

(10) Patent No.: US 6,253,713 B1
(45) Date of Patent: Jul. 3, 2001

(54) PET RESTRAINT SYSTEM

(75) Inventors: Louis Albert Giedeman, III, Dearborn; David James Hoffman, Canton; Irmina V. Reyes-Helfrich, Birmingham; Jeffery Kim, Canton; Gary Wight, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/412,221

(22) Filed: Oct. 5, 1999

(51) Int. Cl.[7] ................................... A01K 27/00
(52) U.S. Cl. ............................................. 119/771
(58) Field of Search ................... 119/770, 771, 119/774, 784

(56) References Cited

U.S. PATENT DOCUMENTS

| | | | |
|---|---|---|---|
| 3,310,034 | * 3/1967 | Dishart | 119/771 |
| 4,292,932 | * 10/1981 | Wooderson | 119/771 |
| 4,597,359 | 7/1986 | Moorman . | |
| 4,676,198 | 6/1987 | Murray . | |
| 4,715,618 | 12/1987 | Harris . | |
| 4,907,541 | * 3/1990 | Thompson | 119/771 |
| 5,131,682 | 7/1992 | Reed . | |
| 5,154,660 | * 10/1992 | Snyder et al. | 119/771 |
| 5,479,892 | 1/1996 | Edwards . | |
| 5,613,467 | * 3/1997 | Arakawa | 119/792 |
| 5,724,920 | * 3/1998 | Meisman et al. | 119/771 |
| 5,813,367 | 9/1998 | O'Brien . | |

FOREIGN PATENT DOCUMENTS

| | | |
|---|---|---|
| 2 233 931 | 1/1975 | (FR) . |
| WO 92/02128 | 2/1992 | (WO) . |
| WO 98/29281 | 7/1998 | (WO) . |

OTHER PUBLICATIONS

"Champion Canine Seat Belt System", Canine Automotive Restraint Equipment.

* cited by examiner

Primary Examiner—Thomas Price
(74) Attorney, Agent, or Firm—David B. Kelley

(57) ABSTRACT

A pet restraint system for a motor vehicle includes a harness adapted to be disposed about a pet. The pet restraint system also includes an anchor having an anchor bar operatively connected to vehicle structure of the motor vehicle. The pet restraint system further includes a belt having one end connected to the harness and another end removably connected to the anchor bar to restrain the pet in a seat of the motor vehicle.

20 Claims, 3 Drawing Sheets

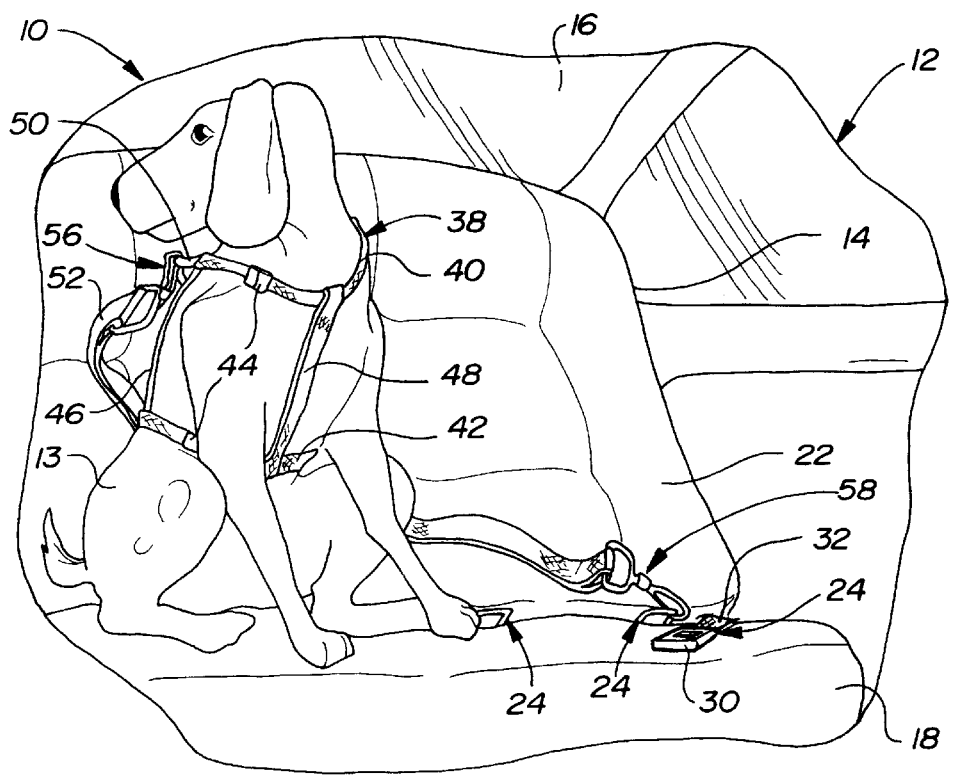
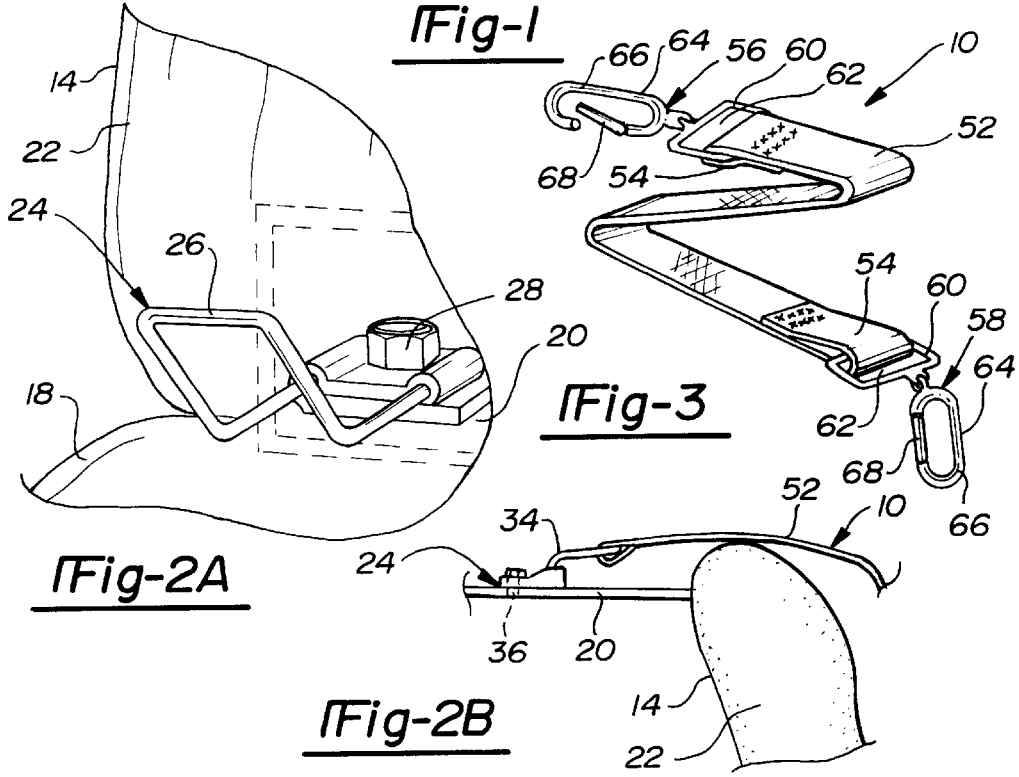

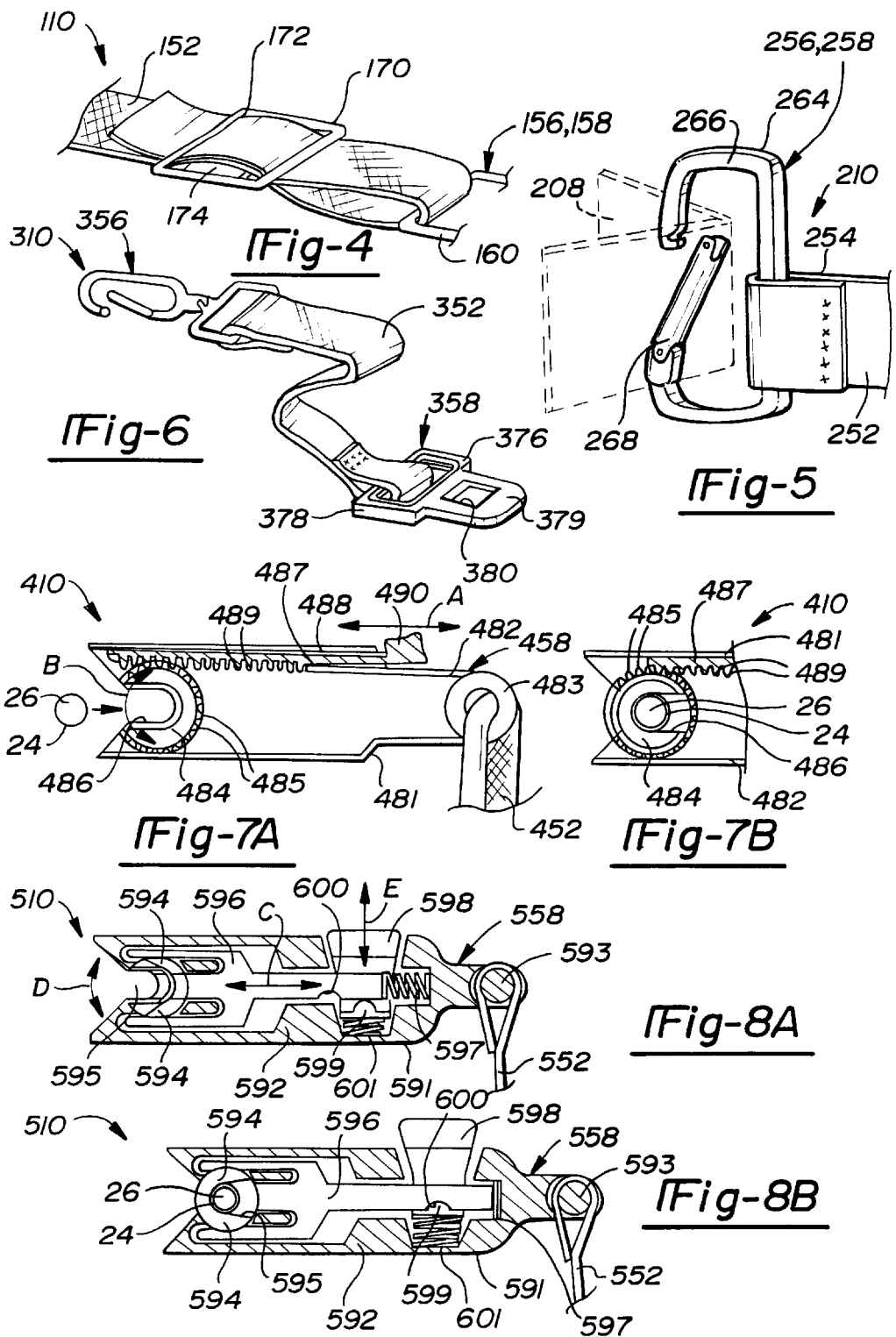

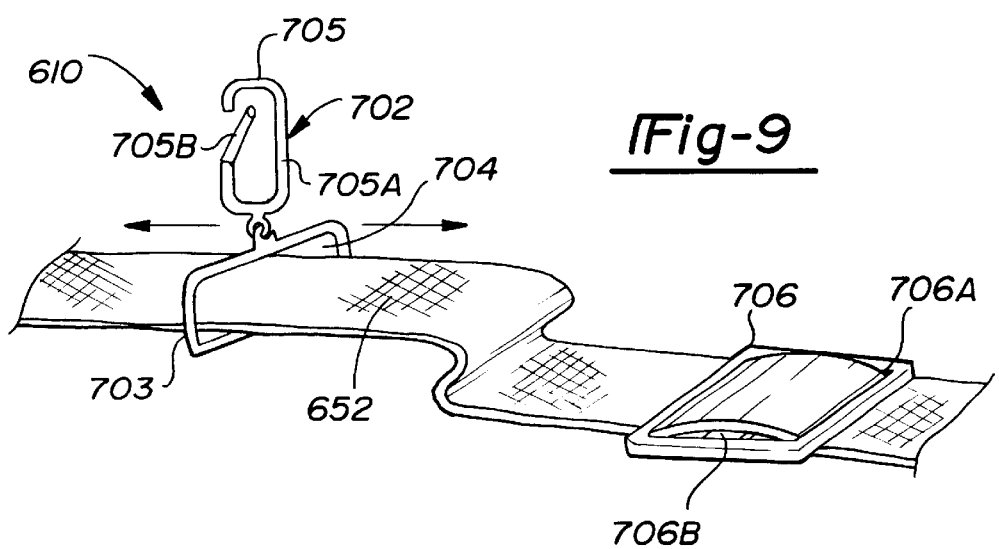

PET RESTRAINT SYSTEM

BACKGROUND OF THE INVENTION

1. Field of the Invention

The present invention relates generally to restraints for motor vehicles and, more specifically, to a pet restraint system for a motor vehicle.

2. Description of the Related Art

It is known to provide seats for a motor vehicle. It is also known to provide a restraint system such as a seat belt to restrain an occupant in a seat of the motor vehicle. Typically, the restraint system includes a retractor attached to the seat or vehicle structure and having a spool attached to the seat belt. The spool is rotatably mounted to the retractor by a shaft. The retractor has a spiral spring on one end of the shaft to urge the spool in a direction for retracting the seat belt when not in use. The restraint system also includes a latch plate attached to one end of the seat belt and a buckle attached by belt webbing to the seat or vehicle structure. The restraint system is buckled and unbuckled by engagement and disengagement between the latch plate and buckle.

It is also known that the occupant of the vehicle may be a human or an animal such as a pet. In the case of a pet, a pet restraint is used to restrain the pet in the motor vehicle. Typically, the pet restraint includes a harness that may be disposed about the pet such as a dog. The harness may be connected to belt webbing to attach the pet restraint to the vehicle. The harness may provide a loop through which the seat belt passes, after which the seat belt is attached to an anchor of the vehicle. Examples of such pet restraints are disclosed in U.S. Pat. Nos. 3,310,034, 4,715,618 and 4,907,541. Further, the pet restraint may be attached to cargo tie-downs in the cargo areas of the motor vehicles.

Although the above pet restraints have worked, it is desirable to positively attach the pet restraint to the motor vehicle. It is also desirable to attach a pet restraint to a motor vehicle using seat belt hardware, belt webbing, child restraint anchors also known as "ISOFIX" anchorages, and/or child restraint top tether anchors. Therefore, there is a need in the art to provide a pet restraint system for a motor vehicle that meets these desires.

SUMMARY OF THE INVENTION

Accordingly, the present invention is a pet restraint system for a motor vehicle. The pet restraint system includes a harness adapted to be disposed about a pet. The pet restraint system also includes an anchor having an anchor bar operatively connected to vehicle structure of the motor vehicle. The pet restraint system further includes a belt having one end connected to the harness and another end removably connected to the anchor bar to restrain the pet in a seat of the motor vehicle.

One advantage of the present invention is that a pet restraint system is provided for a motor vehicle that positively attaches to vehicle structure of the motor vehicle. Another advantage of the present invention is that the pet restraint system is directly attached to seat belt hardware such as a seat belt buckle, belt webbing, child restraint anchor and/or child restraint top tether anchor, and thereby simplifying operation. Yet another advantage of the present invention is that the pet restraint system is directly attached to a buckle or anchorage (not webbing) and provides greater control of the pet's range of motion, by eliminating the potential for belt webbing pay-out. Still another advantage of the present invention is that the pet restraint system utilizes a child restraint anchor (ISOFIX) or a child restraint top tether anchor.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a pet restraint system, according to the present invention, illustrated in operational relationship with a motor vehicle.

FIG. 2A is a perspective view of an anchor for the pet restraint system of FIG. 1.

FIG. 2B is an elevational view of another anchor for the pet restraint system of FIG. 1.

FIG. 3 is a perspective view of the pet restraint system of FIG. 1.

FIG. 4 is a perspective view of another embodiment, according to the present invention, of the pet restraint system of FIG. 1.

FIG. 5 is a perspective view of yet another embodiment, according to the present invention, of the pet restraint system of FIG. 1.

FIG. 6 is a perspective view of still another embodiment, according to the present invention, of the pet restraint system of FIG. 1.

FIGS. 7A and 7B are fragmentary elevational views of a further embodiment, according to the present invention, of the pet restraint system of FIG. 1.

FIGS. 8A and 8B, are fragmentary elevational views of yet a further embodiment, according to the present invention, of the pet restraint system of FIG. 1.

FIG. 9 is a perspective view of still a further embodiment, according to the present invention, of the pet restraint system of FIG. 1.

DESCRIPTION OF THE PREFERRED EMBODIMENT(S)

Referring to the drawings and in particular FIGS. 1 through 3, one embodiment of a pet restraint system 10, according to the present invention, is illustrated for a motor vehicle, generally indicated at 12. The pet restraint system 10 is used to restrain an animal or pet 13 such as a dog in a seat 14 located within an occupant compartment 16 of the motor vehicle 12. The seat 14 has a seat cushion or portion 18 operatively connected to vehicle structure 20 such as a floor pan. The seat 14 also includes a seat back or portion 22 connected to the seat portion 18 by suitable means (not shown). It should be appreciated that the seat 14 is conventional and known in the art.

The pet restraint system 10 includes at least one, preferably a plurality of anchorages or anchors, generally indicated at 24, connected to the vehicle structure 20. In one embodiment illustrated in FIG. 2A, the anchor 24 may be of a lower child restraint or "ISOFIX" type having an anchor bar 26 with a generally inverted "U" shape and attached to vehicle structure 20 by fasteners 28 behind the seat 14 near a juncture of the seat portion 18 and back portion 22. The anchor 24 may also include a guide cup 28 disposed over and surrounding the anchor bar 26 to prevent material from the seat 14 from contacting the anchor bar 26. In another embodiment illustrated in FIG. 1, the anchor 24 may be a seat belt buckle 30 attached to belt webbing 32, in turn, attached to vehicle structure 20 for a seat restraint system (not shown). In yet another embodiment illustrated in FIG. 2B, the anchor 24 may be of a child restraint top tether type having an anchor bar 34 with generally inverted "U" shape and attached to vehicle structure 20 by fasteners 36 near a top of the back portion 22 of the seat 14. It should be appreciated that the anchor 24 is conventional and known in the art.

The pet restraint system 10 includes a harness, generally indicated at 38, for attachment to the pet 13. The harness 38 is of a conventional type and may have a forward belt portion 40 and a rear belt portion 42. The forward and rear belt portions 40 and 42 are made of flexible webbing and generally form a circle about a body of the pet 13. The forward and rear belt portions 40 and 42 include snap-fit attaching devices 44 and adjustment buckles (not shown) to adjust a size of the portions. The harness 38 may also have an upper strap 46 and a lower strap 48 made of flexible webbing extending between the forward and rear belt portions 40 and 42. The pet restraint system 10 also includes an attaching ring or loop 50 attached preferably to the upper strap 46 for a function to be described. It should be appreciated that the harness 38 extends over the animal's chest, around its midsection, over its shoulders, and down its back, with the attaching ring 50 presented at a center of its back, allowing for the attachment of a leash or a belt 52 to be described of the pet restraint system 10.

The pet restraint system includes a belt 52 extending longitudinally. The belt 52 is made of flexible webbing and extends longitudinally. The belt 52 is sewn at its ends to form a loop 54 at each end for a function to be described. The pet restraint system 10 also includes has a first attachment, generally indicated at 56, connected to one of the loops 54 of the belt 52 for attaching to the attaching ring 50 of the harness 38. The pet restraint system 10 further includes a second attachment, generally indicated at 58, connected to the other loop 54 of the belt 52 for attaching to the anchor 24. In the embodiment illustrated in FIG. 3, the first and second attachments 56 and 58 are a clip device with keeper. The first and second attachments 56 and 58 each have a ring member 60 extending through the loop 54 of the belt 52. The ring member 60 is generally rectangular in shape and has an aperture 62 therethrough. The first and second attachments 56 and 58 each have a clip member 64 having a generally "C" shaped clip portion 66 pivotally connected to the ring member 60 and a movable keeper portion 68 pivotally connected to the clip portion 66 to form the clip member 64 with a generally rectangular shape. The clip member 66 is of an enlarged size to act as a handle to allow a person to use the belt 52 as a leash.

In operation of the pet restraint system 10 as illustrated in FIG. 1, the harness 38 is attached to the pet 13 and the pet 13 is placed in the occupant compartment 16 of the motor vehicle 12. The first attachment 56 is attached to the attaching ring 50 on the harness 38 by moving the keeper portion 68 inward toward the clip portion 66 and disposing a portion of the attaching ring 50 within the clip portion 66. The keeper portion 68 is then moved to its original position. The second attachment 58 is attached to the anchor 24 by moving the keeper portion 68 inward toward the clip portion 66 and disposing a portion of the anchor bar 26 within the clip portion 66. The keeper portion 68 is then moved to its original position. The pet 13 is now restrained in the seat 14 of the motor vehicle 12.

Referring to FIG. 4, another embodiment 110, according to the present invention, of the pet restraint system 10 is shown. Like parts of the pet restraint system 10 have like reference numerals increased by one hundred (100). In this embodiment, the pet restraint system 110 includes an adjuster 170 for adjustment of a distance between the first attachment 156 and the second attachment 158. The adjuster 170 has a buckle portion 172 forming a generally rectangular ring and a tongue portion 174 extending across the buckle portion 172. The belt 152 is extended through the adjuster 170 across the tongue portion 174 and through the ring member 160 of the first and second attachments 156 and 158 and back through the adjuster 170 across the tongue portion 174. The pet restraint system 110 operates similar to the pet restraint system 10.

Referring to FIG. 5, yet another embodiment 210, according to the present invention, of the pet restraint system 10 is shown. Like parts of the pet restraint system 10 have like reference numerals increased by two hundred (200). In this embodiment, the pet restraint system 210 includes a clip device such as a carabiner for the first and second attachment 256 and 258. The first and second attachments 256 and 258 each have a clip member 264 extending through the loop 254 of the belt 252, having a generally "C" shaped clip portion 266 pivotally connected to a movable keeper portion 268 to form the clip member 264 with a generally oval shape. The second attachment 258 is attached to the anchor 24 or seat belt webbing 208 of the seat restraint system. The clip member 264 is of an enlarged size to act as a handle to allow a person to use the belt 252 as a leash, and such that the seat belt webbing 208 is not kinked or folded when the second attachment 258 is attached to the seat belt webbing 208. It should be appreciated that the operation of the pet restraint system 210 is otherwise similar to the pet restraint system 10.

Referring to FIG. 6, still another embodiment 310, according to the present invention, of the pet restraint system 10 is shown. Like parts of the pet restraint system 10 have like reference numerals increased by three hundred (300). In this embodiment, the pet restraint system 310 includes a seat belt tongue or latch plate 376 for the second attachment 358. The latch plate 376 is similar to that of the seat restraint system and includes a ring portion 378 attached to the loop 354 of the belt 352 and a tongue portion 379 extending from the ring portion 378 with an aperture 380 extending therethrough. The tongue portion 379 latches into one or more of the seat belt buckles 30 for the anchor 24. The operation of the pet restraint system 310 is otherwise similar to the pet restraint system 10.

Referring to FIGS. 7A and 7B, a further embodiment 410, according to the present invention, of the pet restraint system 10 is shown. Like parts of the pet restraint system 10 have like reference numerals increased by four hundred (400). In this embodiment, the pet restraint system 410 includes a remote mechanism 481 for the second attachment 458 to engage and disengage the anchor bar 26 of the anchor 24. As illustrated, the remote mechanism 481 includes a housing 482 extending longitudinally having a ring portion 483 at one end for attachment to the belt 452. The remote mechanism 481 has a rotatable member 484 disposed in an open end of the housing 482 and rotatably connected thereto. The rotatable member 484 is generally "C" shaped and has a plurality of teeth 485 along an outer periphery thereof. The rotatable member 484 has a recess 486 for receiving the anchor bar 24 of the anchor 24. The remote mechanism 481 also has a linear member 487 extending through an aperture 488 in the housing 482 and having a plurality of teeth 489 therealong to cooperate with the teeth on the rotatable member 484. The liner member 487 includes a handle 490 at one end adjacent the housing 482 to be grasped by an operator. The linear member 487 is moved back and forth in a direction indicated by the arrow A to rotate the rotatable member 484 in a direction indicated by the arrow B to lock and unlock the rotatable member 484 about the anchor bar 26 of the anchor 24. The remote mechanism 481 allows attachment of the belt 452 to the anchor 24 located at the juncture of the seat portion 18 and back portion 22 of the seat 14 to be effected when access to the anchorage is restrictive. The operation of the pet restraint system 410 is otherwise similar to the pet restraint system 10.

Referring to FIGS. 8A and 8B, yet a further embodiment 510, according to the present invention, of the pet restraint system 10 is shown. Like parts of the pet restraint system 10 have like reference numerals increased by five hundred (500). In this embodiment, the pet restraint system 510 includes a latch mechanism 591 for the second attachment 558 to automatically engage the anchor bar 26 of the anchor 24. As illustrated, the latch mechanism 591 includes a housing 592 extending longitudinally and having a ring or loop portion 593 at one end for attachment to the belt 552. The latch mechanism 591 has a pair of rotatable fingers 594 at the other end of the housing 592 and rotatably connected thereto. The rotatable fingers 594 have a recess 595 for receiving the anchor bar 26 of the anchor 24. The latch mechanism 591 also has a linear member 596 disposed in the housing 592 and cooperating with the rotatable fingers 594. The latch mechanism 591 includes a spring 597 disposed between one end of the linear member 596 and the housing 592 to be urge the linear member 596 and rotatable fingers 594 to a locked or closed position. The linear member 596 is moved back and forth in a direction indicated by the arrow C to rotate the rotatable fingers 594 in a direction indicated by the arrow D to lock and unlock the rotatable fingers 594 about the anchor bar 26 of the anchor 24. The latch mechanism 591 also includes a movable actuator 598 to release the linear member 596 when in the locked position. The movable actuator 598 has a projection 599 that cooperates with a recess 600 on the linear actuator 596. The latch mechanism 591 includes a spring 601 disposed between the movable actuator 598 and the housing 592 to urge the projection 599 toward the recess 600. It should be appreciated that the latch mechanism 591 allows for automatic attachment and remote disengagement of the belt 552 to the anchor bar 26 of the anchor 24 located at the juncture of the seat portion 18 and back portion 22 of the seat 14 when access to the anchorage is restrictive. The operation of the pet restraint system 510 is otherwise similar to the pet restraint system 10.

Referring to FIG. 9, still a further embodiment 610, according to the present invention, of the pet restraint system 10 is shown. Like parts of the pet restraint system 10 have like reference numerals increased by six hundred (600). In this embodiment, the pet restraint system 610 includes a third attachment, generally indicated at 702, for cooperating with the belt 652. As illustrated, the third attachment is a clip device with keeper such as a carabiner. The third attachment 702 is similar to the first attachment and second attachment. The third attachment 702 includes a ring member 703 having an aperture 704 through which the belt 652 extends. The ring member 703 is generally rectangular in shape. The third attachment 702 also includes a clip member 705 having a generally "C" shaped clip portion 705a pivotally attached to the ring member 703 and a door portion 705b pivotally attached to the clip portion 705a to form the clip member 705 with a generally rectangular shape. The third attachment 702 is attached to the attaching ring 50 on the harness 38 and the first and second attachments are attached to the anchors 24 to allow free motion of the ring member 703 of the third attachment 702 along the belt 652 to provide the pet 13 with freedom of movement. The first and second attachments can be any of the aforementioned devices for attachment to any of the aforementioned anchors 24. The pet restraint system 610 may include one or more adjusters 706 along the belt 652 that restrict the movement of the ring member 703 of the third attachment 702 along the belt 652, allowing for adjustment of the pet's range of movement. The adjuster 706 has a buckle portion 706a forming a generally rectangular ring and a tongue portion 706b extending across the buckle portion 706a. The belt 652 is extended through the adjuster 706 across the tongue portion 706b. The operation of the pet restraint system 610 is otherwise similar to the pet restraint system 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pet restraint system for a motor vehicle comprising:
a harness adapted to be disposed about a pet;
an anchor having an anchor bar adapted to extend from vehicle structure of the motor vehicle; and
a belt having one end connected to said ha-mess and another end removably connected to said anchor bar to restrain the pet in a seat of the motor vehicle.

2. A pet restraint system as set forth in claim 1 wherein said anchor bar has a generally inverted "U" shape.

3. A pet restraint system as set forth in claim 2 including an attachment to removably attach said belt to said anchor bar.

4. A pet restraint system as set forth in claim 3 wherein said attachment comprises a ring member attached to said belt and a clip member pivotally attached to said ring member.

5. A pet restraint system as set forth in claim 1 wherein said harness has an attaching ring.

6. A pet restraint system as set forth in claim 5 including an attachment for removably attaching said belt to said attaching ring.

7. A pet restraint system as set forth in claim 6 wherein said attachment comprises a ring member attached to said belt and a clip member pivotally attached to said ring member.

8. A pet restraint system as set forth in claim 1 including an adjuster attached to said belt to adjust a length of said belt.

9. A pet restraint system as set forth in claim 1 including a plurality of said anchors, said belt being attached to said anchors.

10. A pet restraint system as set forth in claim 1 including an attachment comprising a ring member having an aperture through which said belt extends and a clip member pivotally attached to said ring member and removably attached to said harness.

11. A pet restraint system for a motor vehicle comprising:
a harness adapted to be disposed about a pet;
an anchor having an anchor bar operatively connected to vehicle structure of the motor vehicle;
a belt having one end connected to said harness and another end removably connected to said anchor bar to restrain the pet in a seat of the motor vehicle;
an attachment to removably attach said belt to said anchor bar; and wherein said attachment comprises a housing, a rotatable member at one end of said housing to engage and disengage said anchor bar and a linear member adapted to be moved to rotate said rotatable member.

12. A pet restraint system as set forth in claim for a motor vehicle comprising:
a harness adapted to be disposed about a pet;
an anchor having an anchor bar operatively connected to vehicle structure of the motor vehicle;
a belt having one end connected to said harness and another end removably connected to said anchor bar to restrain the pet in a seat of the motor vehicle;
an attachment to removably attach said belt to said anchor bar; and
wherein said attachment comprises a housing, a pair of rotatable fingers to engage and disengage said anchor bar, a movable linear member for engaging said fingers, a spring disposed between said linear member and said housing, an actuator adapted to be moved and cooperating with said linear member and a spring disposed between said actuator and said housing.

13. A pet restraint system for a motor vehicle comprising:
a harness adapted to be disposed about a pet and having an attaching ring;
an anchor having a generally inverted U shaped anchor bar adapted to extend from vehicle structure of the motor vehicle; and
a belt having a first attachment connected to said attaching ring of said harness and a second attachment removably connected to said anchor bar to restrain the pet in a seat of the motor vehicle.

14. A pet restraint system as set forth in claim 13 wherein said first attachment comprises a ring member attached to said belt and a clip member pivotally attached to said ring member.

15. A pet restraint system as set forth in claim 13 wherein said second attachment comprises a ring member attached to said belt and a clip member pivotally attached to said ring member.

16. A pet restraint system as set forth in claim 13 including a plurality of said anchors, said first attachment and said second attachment being attached to said anchors.

17. A pet restraint system as set forth in claim 16 including a third attachment comprising a ring member having an aperture through which said belt extends and a clip member pivotally attached to said ring member and removably attached to said harness.

18. A pet restraint system for a motor vehicle comprising:
a harness adapted to be disposed about a pet and having an attaching ring;
an anchor having a generally inverted U shaped anchor bar operatively connected to vehicle structure of the motor vehicle;
a belt having a first attachment connected to said attaching ring of said harness and a second attachment removably connected to said anchor bar to restrain the pet in a seat of the motor vehicle; and
wherein said second attachment comprises a housing, a rotatable member at one end of said housing to engage and disengage said anchor bar and a linear member adapted to be moved to rotate said rotatable member.

19. A pet restraint system for a motor vehicle comprising:
a harness adapted to be disposed about a pet and having an attaching ring;
an anchor having a generally inverted U shaped anchor bar operatively connected to vehicle structure of the motor vehicle;
a belt having a first attachment connected to said attaching ring of said harness and a second attachment removably connected to said anchor bar to restrain the pet in a seat of the motor vehicle; and
wherein said attachment comprises a housing, a pair of rotatable fingers to engage and disengage said anchor bar, a movable linear member for engaging said fingers, a spring disposed between said linear member and said housing, an actuator adapted to be moved and cooperating with said linear member and a spring disposed between said actuator and said housing.

20. A pet restraint system for a motor vehicle comprising:
a harness adapted to be disposed about a pet and having an attaching ring;
a plurality of anchors each having a generally inverted U shaped anchor bar adapted to extend from vehicle structure of the motor vehicle; and
a belt having a first attachment connected to one of said anchors and said second attachment connected to another of said anchors and a third attachment removably connected to said attaching ring of said harness and connected to said belt to allow the pet freedom of motion along said belt while restraining the pet in a seat of the motor vehicle with a seat belt.

* * * * *